Feb. 20, 1923.
L. PATTON
INSECT CATCHER
Filed Apr. 25, 1922 2 sheets-sheet 1
1,446,126
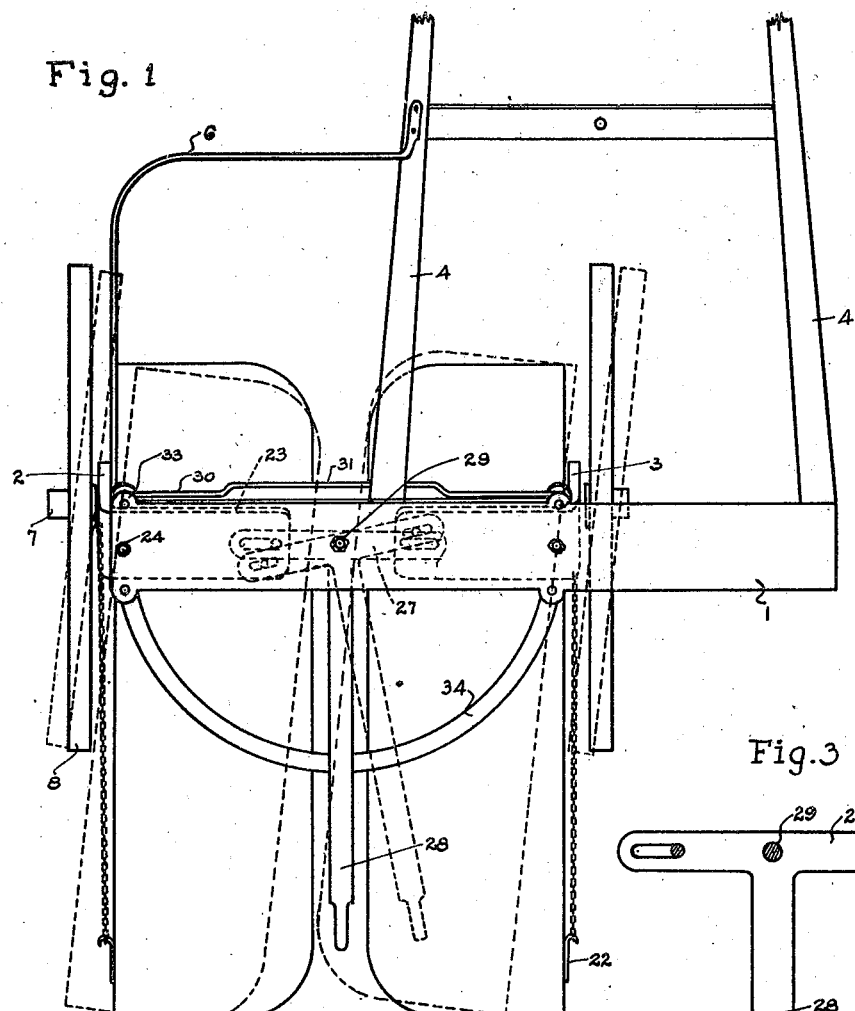
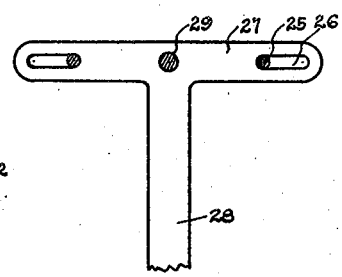
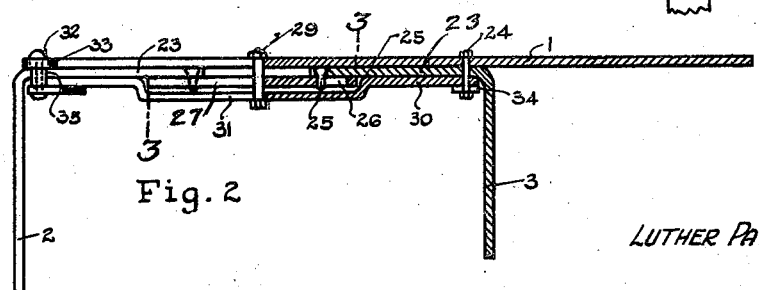
Inventor
LUTHER PATTON.
By
Attorney Feb. 20, 1923.  
L. PATTON  
INSECT CATCHER  
Filed Apr. 25, 1922  
1,446,126  
2 sheets-sheet 2
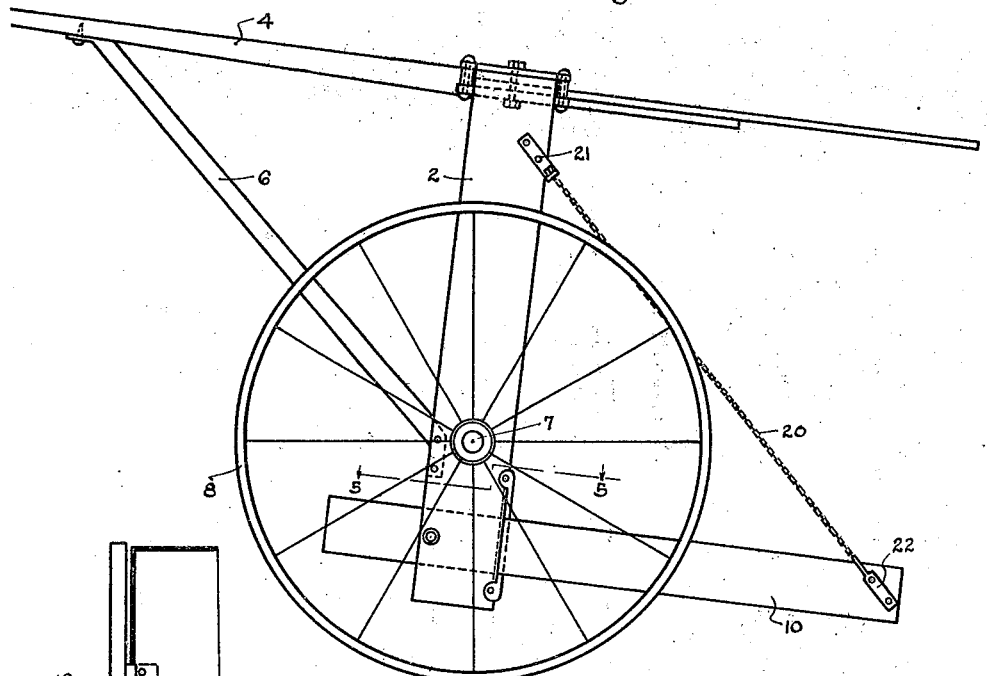
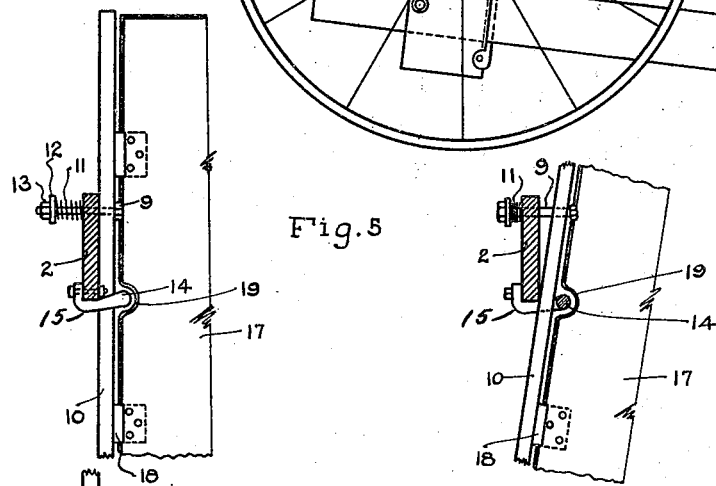
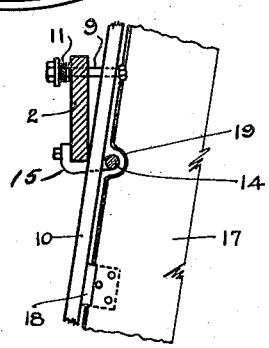
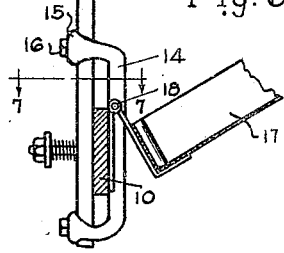
Inventor  
LUTHER PATTON.  
By  
Attorney Patented Feb. 20, 1923.

1,446,126

UNITED STATES PATENT OFFICE.

LUTHER PATTON, OF BIRMINGHAM, ALABAMA.

INSECT CATCHER.

Application filed April 25, 1922. Serial No. 556,527.

*To all whom it may concern:*

Be it known that I, LUTHER PATTON, a citizen of the United States of America, residing at Birmingham, in the county of Jefferson and State of Alabama, have invented certain new and useful Improvements in Insect Catchers, of which the following is a specification.

My invention relates to insect catchers, and particularly to that type in which a wheel frame is provided to carry a pair of suspended troughs adapted to be passed under the limbs of the plants to be treated while the foliage of the plant is being agitated to cause the insects thereon to fall off and be caught in the pans on each side.

More particularly the object of my present invention is to improve certain features of the insect catcher forming the subject matter of Letters Patent issued to me on December 31st, 1918, No. 1,289,250, wherein I show an inverted U-shaped frame vertically disposed and having supporting wheels at each side and insect catching troughs yieldably mounted between the frame legs, the frame overhead being connected in offset relation to the shafts or draft rigging to enable it to be drawn by horse or mule walking on one side of the row of plants to be treated.

One object of my present invention is to substitute for the rigid frame shown in my prior invention a frame divided into halves which are connected to a steering lever by means of which the wheels may be swung to right or left of the line of draft to facilitate the turning of the machine at the end of the row and the guiding of the machine along the row independently of the deviation of the draft animal from a straight line.

My present invention contemplates that this steering lever for the frame members shall project rearwardly beyond the troughs in convenient position to be handled by a man walking down the row behind and drawing the draft animal.

A further feature of my present invention is to simplify and improve the manner of mounting the catching troughs on the frame so that the troughs are free to yield outwardly while being normally held in parallelism. This I accomplish by a much simplified rigging over the disclosure in my prior patent.

Inasmuch as my present invention is an improvement on my previous patented machine, I have omitted from the drawings and description all of these features of the patented machine not essential to the explanation of those features which my present invention relates to. For this reason the drawings do not show the plant agitating devices nor appliances for raising or lowering or otherwise manipulating the troughs, all such features being clearly shown and described in my patent aforesaid.

Referring to the drawings which form a part of this specification, and which illustrates my present invention in its preferred embodiment only:—

Fig. 1 is a plan view of an insect catcher in accordance with my present invention.

Fig. 2 is an elevation shown partly in vertical central cross-section through the upper portion of the frame.

Fig. 3 is a cross-sectional view taken on the line 3—3 of Fig. 2.

Fig. 4 is a side elevation of Fig. 1.

Fig. 5 is a partial cross-sectional view taken on the line 5—5 of Fig. 4.

Fig. 6 is an end elevation of Fig. 5; and

Fig. 7 is a cross-sectional view taken on the line 7—7 of Fig. 6, and showing the trough rocking angularly of the supporting frame.

Similar reference numerals refer to similar parts throughout the drawings.

In the embodiment of my invention illustrated in the drawings, I show a top horizontal cross bar 1 overhanging at one side beyond the vertical side frames 2 and 3 and having attached thereto near its center and at one end the shafts 4 to which the draft rigging (not shown) is connected. The shaft 4 which connects to the bar 1 near the center of the latter is braced to the side frame 2 by a bar 6 which is bent outwardly and downwardly and suitably attached to the side frame 2 near its lower end. Each side frame 2 and 3 carries on its outer side an axle 7 on which a wheel 8 is mounted, and near the lower end of its forward edge I provide a slot $9^a$ through which a bolt 9 passes freely and is made fast to a substantially horizontal trough supporting bar 10. Each bolt 9 projects outwardly beyond its respective frame 2 or 3 there to receive a coil spring 11 which surrounds the bolt and is held under tension between the frame and a washer 12 held on the bolt by a nut 13. Each bar 10 is normally held flat against its respective side frame 2 or 3 and by its spring bolt and by a vertical holder iron 14 having its ends 15 bent outwardly and laterally to engage the rear edge and outer face of its respective side frame 2 or 3, and to be secured thereto by bolts or rivets 16. The vertical body portion of the bar 14 is rounded and disposed so that its axis lies in a plane of the adjacent rear edge of the side frame 2 or 3 as by this arrangement the bar 10 can rock angularly in a horizontal plane between the bar 14 and the frame as is indicated in Fig. 7, so as to permit the rear ends of the bars 10 to swing apart against the springs 11 which would then be compressed by the drawing of the bolts 9 inwardly through the side frames. As soon as a bar 10 is released, its spring bolt will swing it back against and hold it parallel with the inside face of its respective side frame.

I pivot to each side bar 10 a trough 17 by means of strap hinges 18, these hinges being disposed with their joint near the upper edge of the bar 10 so that the trough mounted thereon can be swung up into vertical position against the sides of the frame. Each trough is indented at 19 to clear the bar 14 and avoid engagement therewith when the pan is swung upwardly. The rear end of each pan is supported by a chain 20 connected at its upper end to a bracket 21 near the top of adjacent side frame and at its lower end attached to a clip 22 fast on the rear end of the pan supporting bars 10. The troughs are thus hingedly supported on the bars 10 which in turn are pivotally and laterally adjustably supported on the bolts 9 and are held yieldingly in position by the spring 11, bar 14, and the suspension chain 20.

The side frame bars 2 and 3 have angled upper ends 23 bent inwardly at right angles and each connected adjacent to the bend by its respective vertical pivot bolt 24 to the top bar 1. Each angled end 23 carries a depending stud or rivet pin 25 adapted to be received in an elongated slot 26, one of which is provided at each end of the T-head 27 on the steering lever 28, which is pivotally connected to the frame by a vertical pivot bolt 29 passing down through the bar 1 and through the center of the T-head 27 and through the center of a strap 30, which has its central portion 31 underlying the T-head depressed. I bolt the strap 30 in spaced relation to the top bar by means of bolts 32 which are passed down through side lugs 33 on the top bar 1, and at their lower ends are passed through the ends of an arcuate supporting bar 34 which is riveted to the strap 30 at each end and project rearwardly therefrom so as to support the steering lever 28. The forward ends of the support bar projects beyond the strap 30 sufficiently to receive the forward bolts 32, and spacer sleeves 35 are interposed on each bolt 32 between the bar 34 and the lugs 33 so as to hold the strap spaced sufficiently from the bar 1 to permit the upper ends 23 of the side frame to swing horizontally between them and yet form a rigid top cross member for the machine. The handle 28 projects rearwardly beyond the troughs in position to be grasped and conveniently manipulated by a driver walking on one side of the machine in line with the draft animal. By swinging the hand lever to the left or right the T-head 27 acting through the walls of its slots 26 on the pins 25 will swing the angled ends 23 of the side frames like cranks in opposite directions, causing both side frames and their wheels to swing in parallelism about the pivot bolts 24, and in this manner the machine can be steered and the wheels cut about freely to facilitate making the turns at the end of rows. The lever as it is swung back and forth rides on the support bar 34 which thus relieves its pivot bolt 29 of the duty of supporting the lever. As the side frames 2 and 3 are swung about their vertical axes the wheels, troughs and plant agitating mechanism (not shown) all swing together, the spacing between the inner edges of the troughs not being changed as they remain parallel throughout.

Having thus described my invention, what I claim as new and desire to secure by Letters Patent, is:—

1. An insect catcher comprising an arched wheel frame, comprising side members each carrying a wheel axle and a trough and having an upper angled end, means to pivotally connect said angled upper ends to the top cross member of the frame by vertically disposed pivots, and steering rigging connecting the free ends of said angled portions of the frame sides.

2. In an insect catcher, a frame comprising a horizontal top portion, means to connect a draft rigging thereto, side frames having angled top ends which are pivotally connected to said top frame, and a steering lever pivotally connected to the top frame and having a lost-motion connection to each end of the top angled portion of both side frames, and means to mount a wheel and trough on each vertical side of the frame.

3. In an insect catcher, an inverted U-shaped frame comprising a horizontal top member and means to connect a draft rigging thereto, upright side members each having its upper end angled, a strap having the angled upper ends of the sides interposed between it and the top frame member, means to pivot the angled upper ends of the sides for horizontal play between the top member and the strap, means to connect the top member and strap in spaced relation, a steering lever having a T-head pivoted centrally to the top member and having a lost-motion connection between its ends and the free ends of the angled top portions of the sides, and means to support on each side frame member a wheel axle and a catching trough.

4. An insect catcher in accordance with claim 3, in which said steering lever projects rearwardly of the troughs, and a supporting bar for the lever is attached to said frame.

5. In an insect catcher, an inverted U-shaped frame comprising vertical sides, each having a wheel axle and a trough mounted thereon, a wheel mounted on each axle, each side member having its top end bent at right angles inwardly over the trough, a top bar overlying and a strap underlying the top ends of the sides, bolts pivotally connecting said top ends between the top bar and strap, a steering lever having a T-head centrally pivoted between the top bar and strap, lost-motion connections between each arm of the T-head and the adjacent angled top end of a side member, and means to rigidly connect the top bar and bottom strap in spaced relation.

6. In an insect catcher, an arched frame comprising vertical side members, troughs, and means to mount a trough on each side member comprising a pivot pin for the trough mounted near the forward end of the side member and laterally adjustable therethrough, spring means to oppose an inward lateral movement of the bolt and trough, and a guide adapted to hold the trough in position to rock horizontally about the rear edge of its side supporting member against the action of said spring.

7. In an insect catcher, an arched frame, a trough supporting bar having a pivot at each side of the frame on which it is adapted to swing vertically, said pivot being laterally movable, spring means to oppose said movement, a guide to hold the bar in position to rock horizontally about the rear edge of the frame, and a trough supported by said bar.

8. In an insect catcher, an arched frame, a trough supporting bar pivoted at each side to the frame for vertical play, a pivot for each bar which is laterally movable in the frame, spring means to oppose said pivot's movement, a guide to hold the bar in position to rock about the rear edge of the frame and to be vertically adjustable, and a trough supported by said bar and having an offset portion to clear said guide.

9. In an insect catcher, an arched frame having wide vertical side bars, a horizontal bar having fixed therein a pivot bolt, there being a hole near the lower forward edge of each side frame bar through which said pivot bolt projects outwardly free for axial and limited angular play, a spring surrounding said bolt, means thereon to compress the spring, a vertically elongated guide bar attached to the rear edge of each side frame bar and adapted to hold the horizontal bar free for vertical and pivotal play horizontally about the rear edge of the side frame bar, an insect trough hingedly mounted on said horizontal supporting bar, and a brace from said frame to the rear end of said latter bar.

In testimony whereof I affix my signature.

LUTHER PATTON.

Witness:
  NOMIE WELSH.